(12) United States Patent
Conway

(10) Patent No.: US 7,191,907 B2
(45) Date of Patent: Mar. 20, 2007

(54) ADJUSTABLE SAFETY NET SYSTEM

(75) Inventor: Thomas M. Conway, Park Ridge, IL (US)

(73) Assignee: Cormark, Inc., Des Plaines, IL (US)

( * ) Notice: Subject to any disclaimer, the term of this patent is extended or adjusted under 35 U.S.C. 154(b) by 352 days.

(21) Appl. No.: 10/761,699

(22) Filed: Jan. 21, 2004

(65) Prior Publication Data

US 2004/0149670 A1    Aug. 5, 2004

Related U.S. Application Data

(60) Provisional application No. 60/442,168, filed on Jan. 23, 2003.

(51) Int. Cl.
*A47F 5/00*    (2006.01)

(52) U.S. Cl. .................. 211/180; 211/183; 211/191; 182/138

(58) Field of Classification Search ............... 211/180, 211/183, 186, 189, 182; 312/210, 6; 160/127; 248/535; 182/113
See application file for complete search history.

(56) References Cited

U.S. PATENT DOCUMENTS

| 3,468,430 | A | * | 9/1969 | Lawman | 211/182 |
|---|---|---|---|---|---|
| 4,292,902 | A | * | 10/1981 | Barrineau | 108/146 |
| 4,981,225 | A | * | 1/1991 | Cole | 211/183 |
| 5,524,402 | A | * | 6/1996 | Sykes | 52/243.1 |
| 5,984,121 | A | * | 11/1999 | Cole | 211/183 |
| 6,585,122 | B2 | * | 7/2003 | Calleja | 211/183 |
| 6,609,621 | B2 | * | 8/2003 | Denny et al. | 211/189 |
| 6,619,490 | B2 | * | 9/2003 | Calleja | 211/183 |
| 6,698,604 | B2 | * | 3/2004 | Denny et al. | 211/189 |
| 6,722,512 | B2 | * | 4/2004 | Scully | 211/183 |
| 6,837,388 | B2 | * | 1/2005 | Calleja | 211/183 |
| 6,938,785 | B2 | * | 9/2005 | Denny et al. | 211/189 |
| 2004/0129660 | A1 | * | 7/2004 | Kita | 211/180 |
| 2005/0000928 | A1 | * | 1/2005 | Calleja | 211/183 |
| 2005/0263470 | A1 | * | 12/2005 | Horneland | 211/183 |

* cited by examiner

*Primary Examiner*—Richard E. Chilcot, Jr.
*Assistant Examiner*—Jared W. Newton
(74) *Attorney, Agent, or Firm*—Welsh & Katz, Ltd.

(57) ABSTRACT

A safety net system is configured for mounting to a rack having a pair of spaced apart upstanding posts, in which the upstanding posts have open tops and holes formed in side walls thereof. The safety net system includes a pair of spaced apart uprights, upper and lower mounts operably connecting each upright to a respective rack post and an upper element extending between and mounted to the uprights at about an upper portion of the uprights. A net extends between and is mounted to the uprights and mounted to the upper element. The net is removably mounted to the uprights and to the upper elements and the uprights are variably mountable to the rack posts to vary a height of the net above the posts.

20 Claims, 4 Drawing Sheets

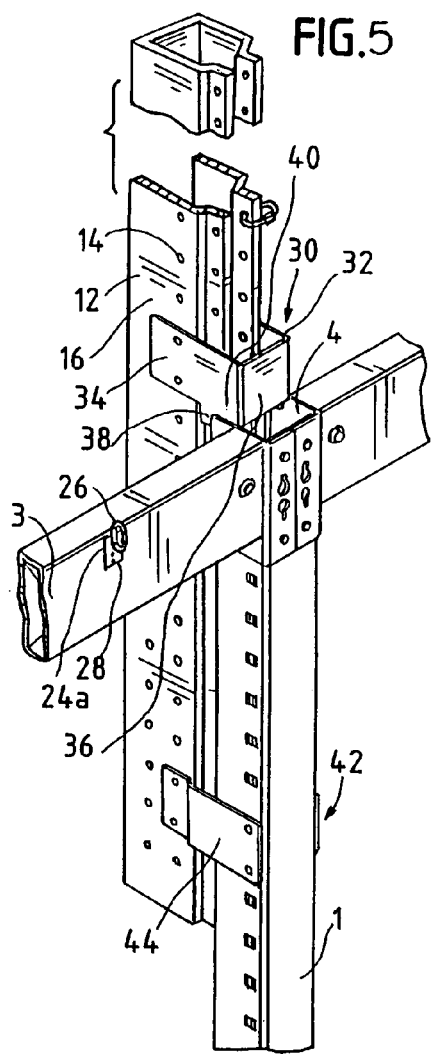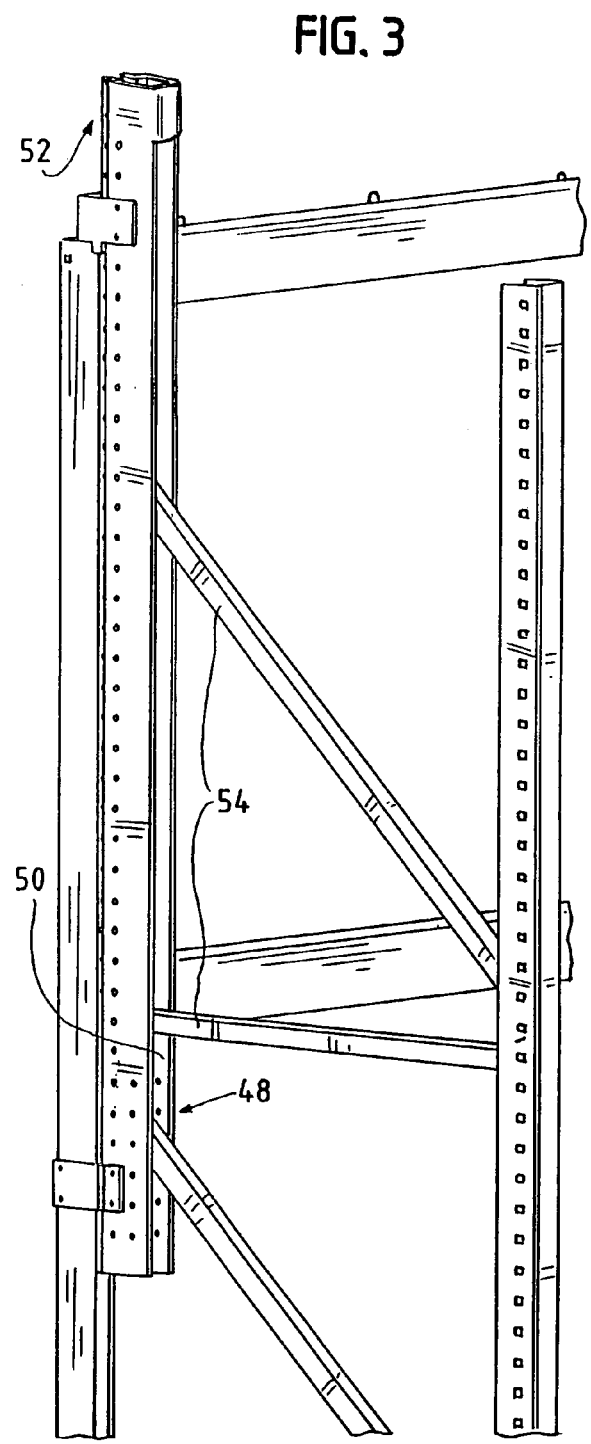

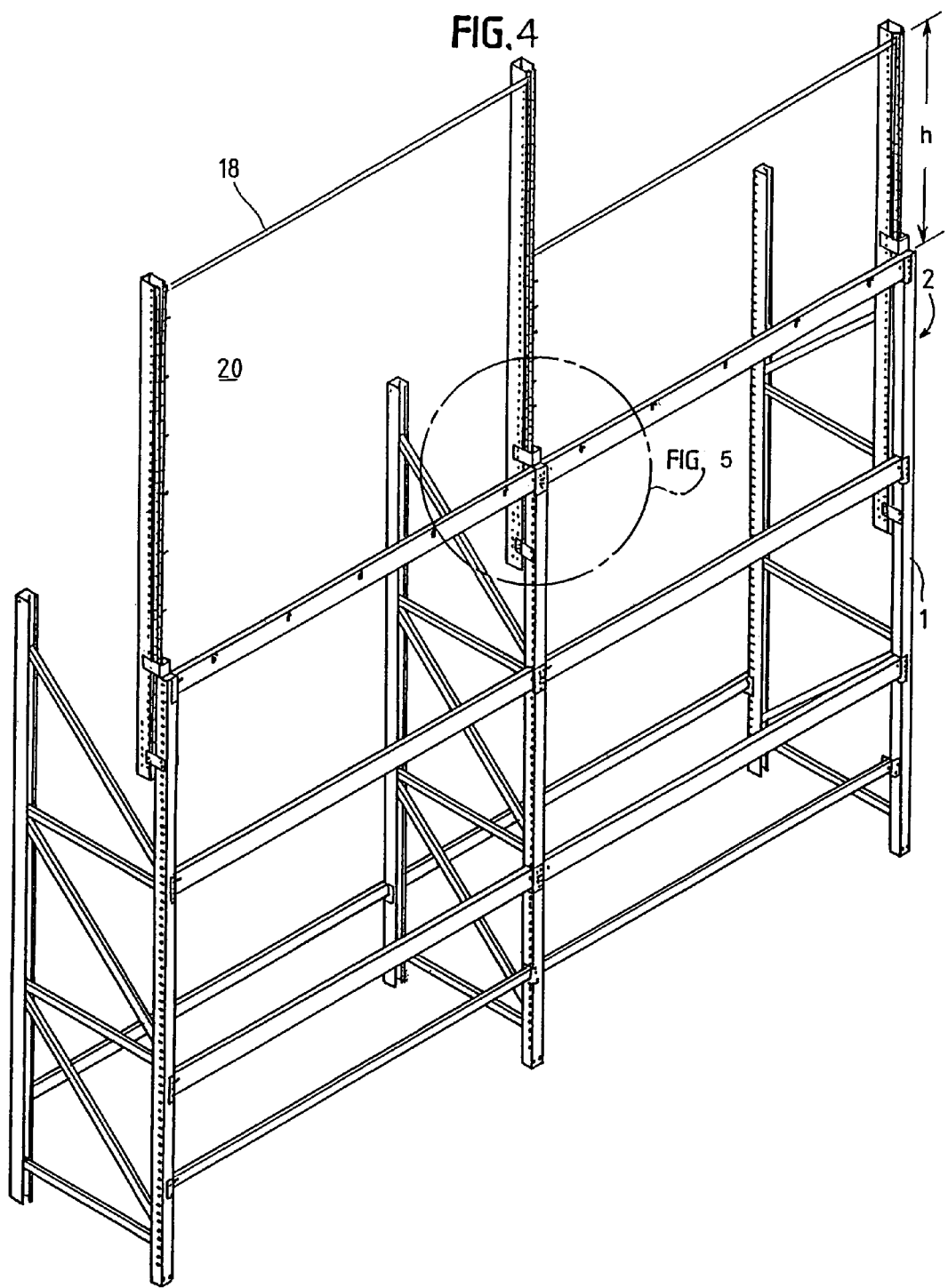

ADJUSTABLE SAFETY NET SYSTEM

CROSS REFERENCE TO RELATED APPLICATION DATA

This application claims the benefit of priority of Provisional U.S. Patent Application Ser. No. 60/442,168, filed Jan. 23, 2003.

BACKGROUND OF THE INVENTION

The present invention is directed to a safety net. More particularly, the present invention pertains to a vertically adjustable safety net that is installed to storage units to prevent items from inadvertently falling from the storage unit.

Pallet racks and other storage systems have previously provided a primary storage support structure in large warehousing storage and distribution facilities. More recently, these types of storage systems have been incorporated into warehousing and generally accessible areas of commercial retail establishments, such as warehouse clubs, and the like.

In many such operations, forklifts or other vehicles are commonly employed to load and remove loaded pallets from pallet racks. As the size of these facilities has increased, the potential for accidentally dropping loads from these racks, or improperly loading the racks has likewise increased. Many facilities have employed safety netting systems to enhance safety.

Safety nets have included various designs. Such nets are installed at the back of the pallet racks to provide a safety barrier to prevent items from falling from the backs of racks. However, nets have not typically been installed at the front of such racks in that is it is often desired to access the racks frequently, and such nets increase the time necessary to remove and/or install the nets before and after accessing the racks. Those safety net systems that have been used at the front of racks are installed on the front of such racks, that is, on the "aisle" side of the racks. This poses problems with the use of certain access equipment (e.g., library ladders), and when used in a retail environment, with signage and the like.

Moreover, the safety net systems that have been employed in connection with pallet racks have tended to be custom designed and installed for each unique rack configuration and size. Because pallet rack systems tend to not be standardized in terms of shape, size and load ratings and tend to have different load distribution requirements, providing a safety net system which is adaptable for use with a wide variety of pallet rack systems has proved problematical.

Accordingly, there exists a need for a safety net of flexible design. Such a safety net system is readily adapted for use with a variety of rack sizes and configurations. More desirably, such a safety net system permits ready height adjustability and can be used with all types of access equipment and signage.

BRIEF SUMMARY OF THE INVENTION

A safety net system is configured for mounting to a rack that has a pair of spaced apart upstanding posts having open tops and holes formed in side walls thereof. The safety net system includes a pair of spaced apart uprights, upper and lower mounts operably connecting each upright to a respective rack post, an upper element, preferably a rigid element, that extends between and mounted is to the uprights at about an upper portion of the uprights and a net extending between and mounted to the uprights and mounted to the upper element.

The net is removably mounted to the uprights and to the upper elements. The uprights are variably mountable to the rack posts to vary a height of the net above the posts. In a preferred embodiment, the rack includes an upper rack beam and wherein the net is removably mounted to the upper rack beam. A plurality of closable loop elements, such as carabiners, can be used for removably mounting the net to the uprights.

In a current embodiment, the upper mount is formed as a U-shaped element having legs and a central connecting region. Fingers depend from the legs and are transverse to the central connecting portion, defining notches therein. The lower mount is formed as a pair of legs mounted to the uprights and mountable to the posts.

To facilitate installing the uprights to the posts, a lower portion of the upright, at a rear side thereof is open. The upper portion of the upright is closed for increased structural strength.

Various heights of the safety net system can be accommodated with a single size (height) by wrapping the net around the upper element to maintain the net in tension. The net can also be maintained in tension between the uprights.

The uprights can mount to a rear surface of the rack posts. This permits unobstructed use of signage and the like that mounts to the front of the rack.

These and other features and advantages of the present invention will be apparent from the following detailed description, in conjunction with the appended claims.

BRIEF DESCRIPTION OF THE SEVERAL VIEWS OF THE DRAWINGS

The benefits and advantages of the present invention will become more readily apparent to those of ordinary skill in the relevant art after reviewing the following detailed description and accompanying drawings, wherein:

FIG. 3 is a partial rear view of the rack of FIG. 2 showing the installation of a net system upright installed to the rack upright;

FIG. 4 is a perspective illustration similar to FIG. 2;

FIG. 5 is an enlarged illustration of the areas indicated in FIG. 4, showing an exemplary attachment of the net system upright to the rack upright.

DETAILED DESCRIPTION OF THE INVENTION

Figure 1:
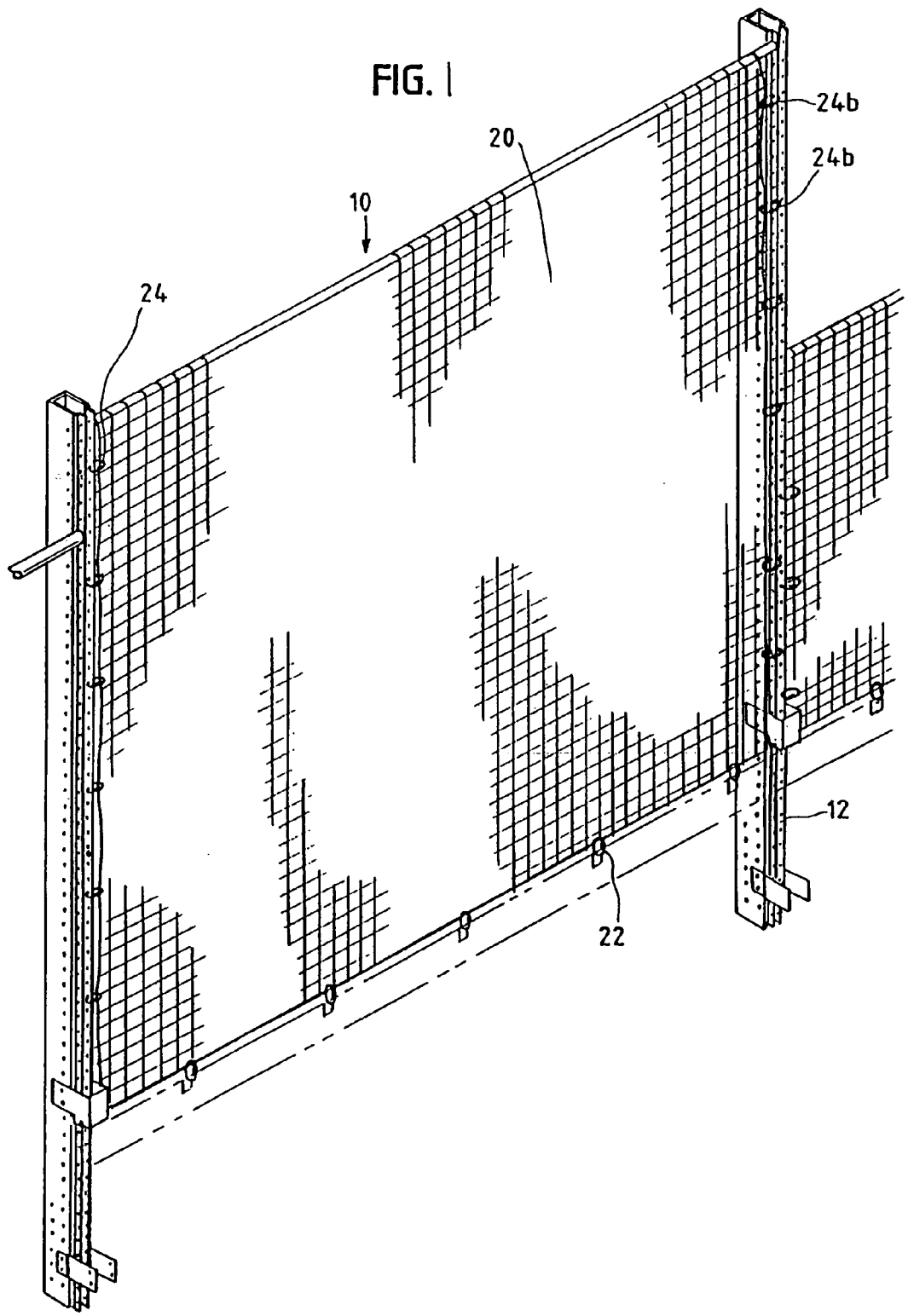
FIG. 1 is a perspective illustration of a safety net system embodying the principles of the present invention.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated.

It should be further understood that the title of this section of this specification, namely, "Detailed Description Of The Invention", relates to a requirement of the United States Patent Office, and does not imply, nor should be inferred to limit the subject matter disclosed herein.

Figure 2:
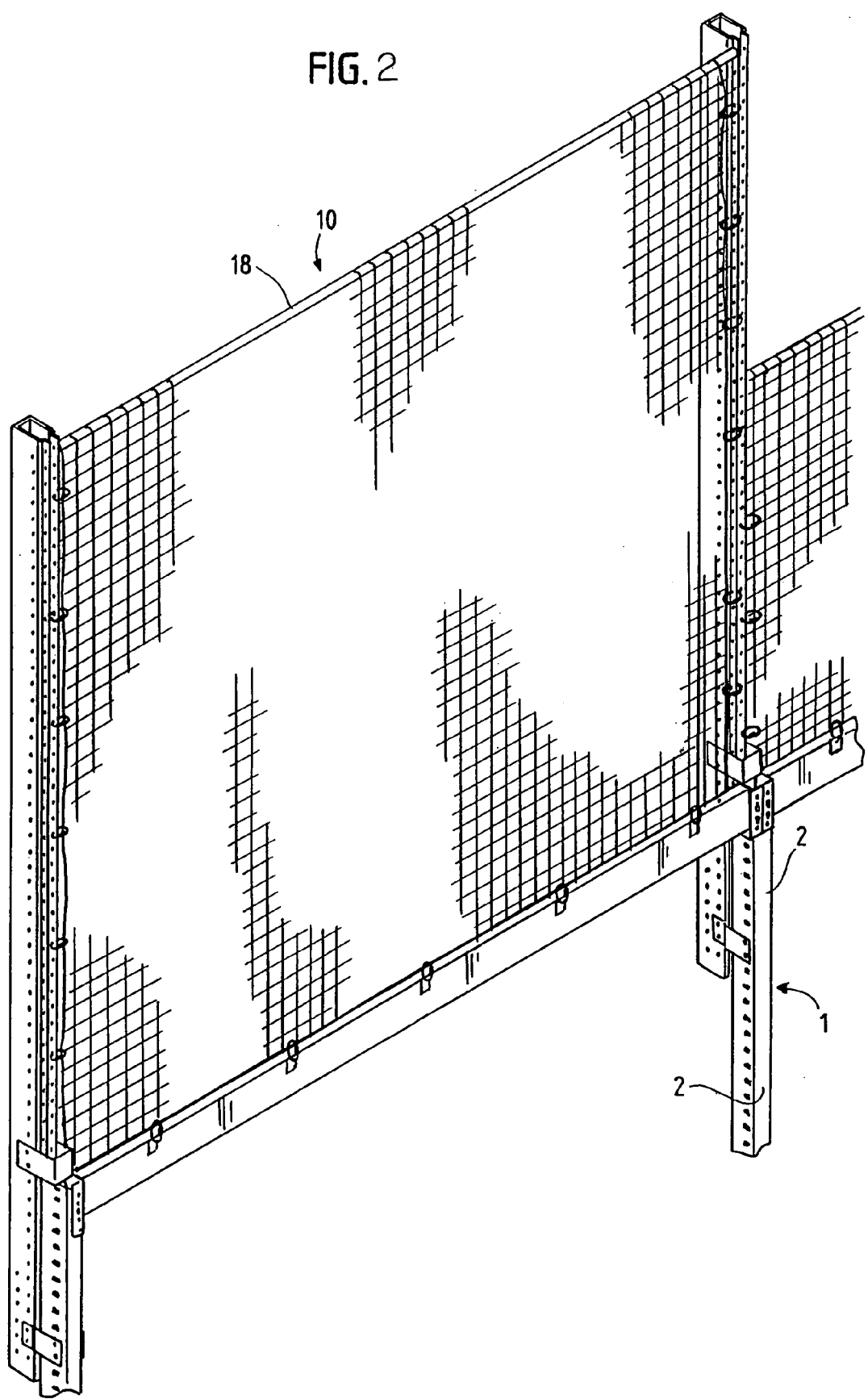
FIG. 2 is a perspective illustration similar to FIG. 1 in which the safety net system is shown mounted to a conventional rack system.

Referring now to the figures and in particular to FIG. 1, there is shown a safety net system 10 embodying the principles of the present invention. The net system 10 is shown freestanding, that is, without installation on an associated rack. FIG. 2 illustrates the safety net system 10 installed on the uprights 1 of, for example, a pallet rack 2. For purposes of the following description and to prevent confusion, the rack uprights 1 will be referred to as posts and the net system uprights 12 will be referred to as uprights.

Advantageously, as will be described herein, the present safety net system 10 permits readily adjusting the height of the net (e.g., by 2 inch increments) to achieve a desired or required net height. The present system 10 does so and also permits use with standard light-duty and heavy-duty rack systems 2. Another important and novel feature is the continued ability to use signage at the front of the rack 2 to which the safety net system 10 is installed.

The safety net system 10 includes, generally, opposing uprights 12, each having a plurality of openings 14 formed in a face or a flange 16 thereof. A cross-beam or tube 18 (i.e., round cross bar) extends between the uprights 12, at about the top thereof. Alternately, although not shown, cables can be used to span the uprights 12 in lieu of a cross-beam or tube 18 at the top.

A net 20 extends between the uprights 12 on the sides and between an upper beam 3 of the rack 2 and the net system beam or tube on the bottom (if used) 22 and top 18, respectively. At the uprights 12, the net 20 is attached by threaded connectors or carabiners 24. Carabiners 24, as will be recognized by those skilled in the art, are closeable clips formed in a loop 26. A threaded or snap-fastening portion opens to permit fastening an article to the clip and locks closed (by a spring, a snap-lock or mating threads) to secure the article to the loop 26. The carabiner 24 permits securely holding the net 20 when the carabiner 24 is closed and readily removing the net 20 when the carabiner 24 is open.

Carabiners 24 are inserted into the spaced apart openings 14 in the uprights 12. In this manner, the number of carabiners 24 that are used can be varied to accommodate different anticipated loads that are positioned "behind" the net 20. That is, when a large or heavy load is on the rack 2 behind the net 20, a larger number of carabiners 24 can be used to hold the net 20 to the uprights 12. Conversely, when a smaller or lighter load is on the rack 2, a lesser number of carabiners 24 can be used to secure the net 20 to the uprights 12.

In a current embodiment, to secure the net 20 at the lower location, i.e., at the rack upper beam 3, a carabiner 24 is welded or otherwise secured to a plate 28, and a number of plates 28 are, in turn fastened (e.g., screwed) to the rack upper beam 3 for securing the lower edge of the net 20. At the top, the net 20 is threaded over or weaved onto the upper support 18 (e.g., the upper tube). In the event that the net 20 is longer (in height) than the distance between the upper support 18 and the top rack beam 3, the remaining net 20 section can be folded over the upper support 18. As such, the net 20 does not have to be custom-made for each installation. Rather, a standard height net 20 can be used for a variety of installations.

The net system uprights 12 use a novel two-location attachment for securing the net system upright 12 to the rack posts 1. This arrangement provides a number of distinct advantages over known safety systems. First, the present net system mount 30 permits vertically adjusting the height h of the net 20 between (it is anticipated) about 4 feet and about 8 feet upward from the upper mounting location (generally the rack upper beam 3). Moreover, in that the present mount arrangement 30 mounts the net system uprights 12 to the back face of the front of the rack 2, commonly used access equipment, such as library ladders and the like can still be used, without interference from the net system 10. Still another advantage is that sign systems that otherwise could not be used with net systems that mount to the front face of the rack can still be used, again without interference from the safety net system 10.

An upper mount 32 is formed as a U-shaped element having upper leg portions 34 that are secured to the net system uprights 12. The center connecting or U portion 36 of the upper mount 32 extends forwardly of the upright 12 to overlie the post 1. The mount 32 is configured to secure to many standard size rack posts 1, such as racks that are 1⅜ inches deep (light-duty racks) or 3 inches deep (heavy-duty racks). To this end, the mount 32 has depending fingers 38 that extend transverse to the U portion 36 that insert into the top 4 of the post 1 (see FIG. 5). The fingers 38 define notches 40 into which the top 4 of the post 1 inserts. Engagement of the appropriate fingers 38 with the rear wall of the post 1 secures the upper mount 32 to the post 1 to, in turn, secure the upright 12 to the post 1. In the event that other than standard depth rack posts 1 are used, additional depending fingers 38 (to define additional notches) can be formed on the upper mount 32 to accommodate these different sized posts.

A lower mount portion 42 is formed as a pair of legs 44 that extend transversely (e.g., forwardly) from the upright 12 at a lower portion of the upright 12. Essentially, as seen in FIG. 5, the lower mount 42 is formed as individual legs 44 that are mounted to the sides of the upright 12. The free ends 46 of the legs 44 are then fastened to the rack post 1 to secure the upright 12 to the post 1.

As seen in FIG. 3, a lower portion 48 of the upright 12 has an open back portion, as indicated at 50. The upper portion 52 of the upright 12, on the other hand has a closed back. The open back 50 of the lower portion 48 permits "sliding" the upright 12 along the post 1 to a desired height to allow installation of the upright 12 over structural members (e.g., permits bypassing cross-bars, beams and angles, as indicated at 54) that may form part of the rack 1. This permits vertical adjustment of the upright 12 on the rack 2. The closed back of the upper portion 52 provides the structure and strength required for the safety net system 10. The upright 12 has, as set forth above, a plurality of holes 14 for mounting the carabiners 24 thereto. In a current embodiment, the holes 14 are spaced about 2 inches on center along the length of the upright 12.

In use, the present safety net system 10 can be readily "slid" to one side or the other by unfastening the carabiners 24 (for example carabiners 24a) on one side of the net 20 (that connect the net 20 to the upright 12) and the carabiners (e.g., carabiner 24a) along the rack upper beam 3. A reverse procedure is then used to re-secure the net 20 to the rack 2. Access to materials behind the net 20 near a corner is readily had by merely unfastening the appropriate carabiners. Alternately, a self-closing system can be used for the safety net system (along with the present adjustable mounting system), such as that disclosed in copending U.S. patent application to Padiak et al., U.S. Ser. No. 10/280,323, filed Oct. 25, 2002, entitled, Security Cover, the disclosure of which application is incorporated herein by reference.

The present safety net system 10 provides a number of advantages over known net systems. First, the system 10 design is flexible such that it can be used to provide safety nets 20 at heights h varying between (it is anticipated) four and eight feet above the rack 1 structure. This is readily accomplished by adjusting the height h at which the upright 12 is secure to the post 1, and "wrapping" the unused net 20 (f necessary) over the upper tube 18. Moreover, the present system 10 can be used, without modification or "customization", for mounting to racks that employ different sizes of posts 1, and importantly can be used, with rack systems 2 having signage mounted to the front thereof.

All patents referred to herein, are hereby incorporated herein by reference, whether or not specifically do so within the text of this disclosure.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present invention. It is to be understood that no limitation with respect to the specific embodiments illustrated is intended or should be inferred.

What is claimed is:

1. A safety net system for mounting to a rack having a pair of spaced apart upstanding posts, the rack adapted for use of access equipment and sign systems in front of the rack posts and for connection of the rack posts with structural members behind the rack posts, a rear of each of the rack posts facing behind the rack posts, the safety net comprising:
   a pair of spaced apart uprights;
   upper and lower mounts structured and dimensioned for operably connecting each upright to a respective rack post;
   an upper element extending between and mounted to the uprights;
   a net extending between and mounted to the uprights and mounted to the upper element,
   a first one of the uprights having a front and an opposing rear, with the rear of the first upright being open below an upper portion of the first upright;
   wherein the net is removably mounted to the uprights and to the upper element;
   wherein at least one of the upper mounts is formed as a U-shaped element having legs and a central connecting region and including fingers depending from the legs to define notches therein;
   wherein the uprights are variably mountable to the rack posts to vary a height of the net relative to the posts; and
   and wherein the first upright is mountable to the respective rack post with at least part of the front of the first upright being adjacent the rear of the respective rack post and the opposing open rear of the first upright being spaced apart from the respective rack post.

2. The safety net system in accordance with claim 1 wherein the upper element is a rigid member.

3. The safety net system in accordance with claim 2 wherein the net is wrapped around the upper element to maintain the net in tension.

4. The safety net system in accordance with claim 3 wherein the net is maintained in tension between the uprights.

5. The safety net system in accordance with claim 1 including a plurality of closable loop elements for mounting the net to the uprights.

6. The safety net system in accordance with claim 5 wherein the closed loop elements are carabiners.

7. The safety net system in accordance with claim 1 wherein at least one of the lower mounts is formed as a pair of legs mounted to one of the uprights and mountable to the respective rack post.

8. The safety net system in accordance with claim 1 wherein the upper portion of the first upright at the rear side is closed.

9. The safety net system in accordance with claim 1 wherein the uprights are structured and dimensioned for mounting respectively adjacent rear surfaces of the rack posts.

10. A safety net system, for mounting to a rack having a pair of spaced apart upstanding posts with structural members connected to the rack posts, the safety net comprising:
    a pair of spaced apart uprights;
    a net extending between and removably mounted to the uprights;
    each of the uprights having two opposing sides;
    the two sides of each of the uprights being connected to each other at a first portion of each upright;
    a front and a rear of a first one of the uprights both being continuously open without interruption at a second portion of the first upright, the second portion of the first upright extending for at least the majority of the length of the first upright;
    the first upright being structured and dimensioned to enable mounting of the first upright to one of the rack posts with at least one of the structural members passing between the two sides of the first upright and through the open front and rear at the second portion of the first upright.

11. The safety net system in accordance with claim 10, further comprising:
    a generally U-shaped upper mount;
    the upper mount comprising two leg portions;
    the two leg portions being secured respectively to the two sides of one of the uprights;
    the upper mount comprising depending fingers that define at least one notch;
    the upper mount structured and dimensioned to enable top edges of one of the rack posts to fit into the at least one notch.

12. The safety net system in accordance with claim 10, further comprising:
    a lower mount;
    the lower mount comprising two spaced apart leg portions;
    the two leg portions being secured respectively to the two sides of one of the uprights;
    the two leg portions being mountable to one of the rack posts.

13. The safety net system in accordance with claim 10, further comprising:
    a rigid upper element;
    the upper element extending between and mounted to the uprights.

14. The safety net system in accordance with claim 10, further comprising:
    an upper element;
    the upper element extending between and mounted to the uprights;
    the net removably mounted to the upper element.

15. The safety net system in accordance with claim 10, further comprising a plurality of closable loop elements for mounting the net to the uprights.

16. The safety net system in accordance with claim 10, wherein the net is maintained in tension between the uprights.

17. The safety net system in accordance with claim 10, wherein each of the uprights is variably mountable to a respective one of the rack posts to vary a vertical location of the net relative to the rack posts.

18. A method for inhibiting the inadvertent falling of items from a storage rack having first and second spaced apart upstanding posts with structural members connected to the rack posts, the method comprising:

placing a first upright over at least one of the structural members connected to the first rack post, with the at least one structural member passing between two sides of the first upright and through a front and a rear of the first upright;

wherein said front and rear are both continuously open without interruption at a portion of the upright, wherein said portin extends for at least the majority of the length of the first upright;

selecting a vertical location for the first upright relative to the first rack post;

securing the first upright to the first rack post at the selected vertical location;

securing a second upright to the second rack post;

extending a net between the two uprights, and removably mounting the net to the two uprights.

19. The method as in claim 18, further comprising:

removably mounting the net to an upper rack beam that is connected to each of the two rack posts.

20. The method as in claim 18, further comprising:

removably mounting the net to an upper element that extends between and is mounted to the two uprights.

* * * * *